United States Patent [19]
Trueman et al.

[11] Patent Number: 5,753,807
[45] Date of Patent: May 19, 1998

[54] BRAKE ADJUSTMENT INDICATOR SYSTEM

[76] Inventors: Wayne Trueman, 3748 Hidden Springs Ct., El Sobrante, Calif. 94803; Theodore P. Spero, 164 Damascus Loop, Pacheco, Calif. 94553

[21] Appl. No.: 560,479

[22] Filed: Nov. 17, 1995

[51] Int. Cl.$^6$ .................................................. G01M 15/00
[52] U.S. Cl. ............................................. 73/121; 340/453
[58] Field of Search ............................. 73/121, 126, 127, 73/129, 132, 9, 118.1; 340/453, 454

[56] References Cited

U.S. PATENT DOCUMENTS

| | | | |
|---|---|---|---|
| 1,612,928 | 1/1927 | Langbein | 73/121 |
| 2,449,091 | 9/1948 | Starling | 73/121 |
| 3,648,511 | 3/1972 | Groat et al. | 73/121 |
| 3,995,475 | 12/1976 | Cline | 73/132 |
| 4,062,224 | 12/1977 | Zeleney | 73/121 |
| 5,522,259 | 6/1996 | Schmidt et al. | 73/132 |

OTHER PUBLICATIONS

One page advertisement by HS&S Products, entitled "Air Brake Adjustment Indicators Brak Chek" (May 1995).
One page advertisement by Brake Alert, Inc. entitled "Introducing Brake Alert" (May 1995).

*Primary Examiner*—George M. Dombroske
*Attorney, Agent, or Firm*—Bielen, Peterson & Lampe

[57] ABSTRACT

A brake adjustment monitoring system, including a sensor having a movable actuator for mounting in or on a brake service chamber and circuitry which responds to the actuator's position to generate a display indicating whether the brake is correctly adjusted (after actuation of the brake). In preferred embodiments mounted in a motor vehicle having several brake assemblies each including a service chamber, a sensor is mounted in each service chamber, and a display panel mounted to the dashboard indicates the status of each brake assembly or each pair of the brake assemblies. Preferably, each sensor is designed for use with an air brake assembly including a service chamber, a push rod having one end outside the chamber and another end in the chamber, and a slack adjuster connected to the push rod's outer end. In response to air pressure in the service chamber (produced in response to actuation of the vehicle's brake pedal), the push rod's outer end translates away from the chamber (with an adjustable maximum travel distance). One sensor is mounted through the wall of the chamber, with an actuator positioned in the chamber in the path that a brake element (e.g., a diaphragm plate connected to the push rod) follows when the brake is applied. If the brake is improperly adjusted, the brake element travels sufficiently far, with full brake application, that it engages the actuator (thereby causing the display to indicate improper adjustment of the brake assembly). If the brake assembly is properly adjusted, the brake element does not engage the actuator (and the display indicates proper adjustment of the brake assembly).

9 Claims, 9 Drawing Sheets

BRAKE ADJUSTMENT INDICATOR SYSTEM

FIELD OF THE INVENTION

The present invention relates to a system for monitoring adjustment of air pressure-actuated brakes (such as brakes mounted in association with axles of a truck or other motor vehicle). In embodiments for monitoring adjustment of a brake assembly including a pressure-actuated push rod for moving a slack adjuster, the invention employs a mechanically actuated sensor to sense the maximum travel distance of the push rod (or an element connected to the push rod) and (after actuation of the brake assembly) displays an indication as to whether the slack adjuster is within adjustment or has exceeded specified maximum limits.

DESCRIPTION OF THE RELATED ART

In air pressure-actuated brake systems commonly used in motor vehicles, such as air brake systems used in trucks and buses, a push rod is translated in response to an air pressure application, and the push rod in turn causes braking by forcing a brake shoe against a rotating drum. Typically, there are two such brake assemblies for each axle of a vehicle (one at each end of the axle).

One conventional design for a brake assembly of this type is shown in FIGS. 1 and 1A. The brake assembly of FIG. 1 includes an air chamber 8 and 8' (with chamber portion 8 sometimes referred to as a service chamber or service brake chamber and chamber portion 8' sometimes referred to as an emergency chamber), and diaphragms 10 and 16, return springs 12 and 13, service push rod diaphragm plate 6 mounted inside service chamber 8, and rod 22 and plate 19 mounted inside emergency chamber 8'. Push rod 4 is rigidly attached to diaphragm plate 6. Push rod 22 is rigidly attached to emergency diaphragm plate 19 within chamber 8' and to plate 21 within chamber 8. Push rod 4 and associated plate 6 are free to move within chamber 8 depending upon the air pressure existing at service air input port 23 (shown in FIG. 1A). When the vehicle's system air pressure builds up to a preset minimum pressure (usually 60 psig), this pressure forces diaphragm 16 to the right, allowing spring 13 to relax and plates 19 and 17 to also move right, and compressing spring 18. Plates 17 and 19 and associated spring 13 remain in this position with spring 18 compressed as long as the air brake system pressure is maintained at or above the cut off pressure of 60 psig. If system pressure is lost, spring 18 forces plates 17 and 19 to the left which compresses spring 13 and causes push rod 22 and plate 21 to push to the left (in FIG. 1) against service diaphragm plate 6 which in turn causes push rod 4 to move to the left thereby causing slack adjuster 2 to rotate to position 2' (shown in phantom view).

The left end of push rod 4 is attached to one end of slack adjuster 2. The other end (2A) of slack adjuster 2 controls a brake shoe assembly (not shown, but typically including a cam such as an S cam, at least one brake shoe, and a brake drum). When rod 4 translates to the left (in FIG. 1), slack adjuster 2 pivots about its pivot portion 2B (into position 2' shown in phantom view), and as it does, end portion 2A exerts a torque (counter-clockwise in FIG. 1) which forces a brake shoe against a rotating drum. To release the brake, rod 4 is moved back to the right, thereby rotating slack adjuster 2 about pivot portion 2A back to its original position.

Push rod 4 translates to the left in response to an air pressure increase at input port 23 and hence within chamber 8 (due to conventional means not shown). The pressure increase resulting from application of the air brakes causes diaphragm 10 to move to the left (thereby pushing plate 6 and thus rod 4 to the left). Spring 12 is compressed by the leftward-moving plate 6. To retract rod 4 to the right, air is released from within chamber 8 via service chamber input port 23 (by conventional means not shown) thus reducing the air pressure which had caused plate 6 to compress spring 12. In response, spring 12 relaxes (elongates) back to its rest position, thereby pushing plate 6 (and thus pulling rod 4 and pushing diaphragm 10) to the position shown in FIG. 1.

The FIG. 1 assembly includes emergency brake spring 18 within emergency brake chamber 8' attached to chamber 8. FIG. 1 shows spring 18 compressed between plate 17 and the right wall of chamber 8' (at which release bolt 20 is mounted). In response to application of the emergency brake or reduction of the vehicle air system pressure below a preset limit (usually 60 psig), spring 18 will be released to cause it to push plate 17 (and thus plate 19, rod 22, plate 21, and rod 4) to the left, and thus rotate slack adjuster 2 and apply the brake. After such emergency brake application, spring 18 is returned to the position shown in FIG. 1 by removing the emergency brake or building up the system air pressure above the preset cut off point (usually 60 psig) to increase the pressure within chamber 8', which (as described above) causes diaphragm 16 to push plate 17 to the right, so that plate 17 compresses spring 18 into the FIG. 1 position.

The travel distance of push rod 4 is determined by the amount of wear on the various brake components and the adjustment of slack adjuster 2. By turning control knob 3 (shown in FIG. 1), an operator can vary the angle through which slack adjuster 2 is free to rotate prior to causing the brake shoe to contact the brake drum (from the position shown in FIG. 1 to position 2' indicating the maximum allowable stroke distance) thereby adjusting the brake by setting the maximum travel distance of push rod 4. It should be appreciated that, typically, there will be a right angle between the longitudinal axes of slack adjuster 2 and push rod 4 when adjuster 2 has reached its maximally counter-clockwise rotated position.

U.S. government regulations (that have recently come into effect) mandate use of brake adjustment indicators on air-braked vehicles. After full application of an air brake (such as that shown in FIG. 1), such an adjustment indicator displays an indication as to whether the brake assembly is properly adjusted (i.e., whether the maximum push rod travel distance is within a specified limit). The present invention is intended to generate and display an indication of this type.

Several brake adjustment indicator systems have been developed for use on air-braked vehicles. However, most such systems inconveniently display the adjustment indication at a position near the service chamber or push rod (so that the display is not visible to the vehicle operator seated in the vehicle cab facing the dashboard). One commercially-available brake adjustment indicator system has a dashboard-mounted LED (light-emitting diode) display, but it relies on a magnetic sensor mounted on a bracket outside each service chamber to sense displacement of a magnet on the push rod (the magnet is on the exposed portion of the push rod between the service chamber and slack adjuster). Such a position sensor can fail to give an accurate reading if the magnet on the push rod is moved or becomes dislodged by impact from road debris. Also, due to its vulnerable position, such a sensor is subject to being knocked off the bracket or otherwise misaligned relative to the magnet. Another system currently available simply places a piece of colored plastic cover over the push road to give a visual indication of the amount of push road travel. The problem here is that these plastic pieces may become obscured by mud, ice, snow, or the like and require that each one of the equipped chambers be examined individually.

Until the present invention it was not known how to design a brake adjustment indicator system with a dashboard-mounted display and with brake adjustment sensors that overcome the noted problems and limitations of conventional systems.

SUMMARY OF THE INVENTION

The invention is an air pressure-actuated brake assembly adjustment monitoring system which includes a self-contained sensor having a movable actuator portion for engaging a moving element of the brake assembly, and circuitry for generating a display indicating (after full actuation of the brake) whether the brake assembly is correctly adjusted. Preferably, the actuator portion is mounted within a service chamber of the brake assembly. In preferred embodiments mounted in a motor vehicle having several brake assemblies each including a service chamber, a sensor is mounted with an actuator portion extending within each service chamber, and a display panel mounted at the vehicle dashboard indicates the status of each axle pair of brake chambers.

In preferred embodiments (for use with a five axle vehicle having a pair of brake assemblies for each axle), the system includes ten mechanically actuated sensors, each sensor having an actuator mounted within a service chamber of a different one of the brake assemblies. In other preferred embodiments (for use with a two axle vehicle, such as a school bus, having a pair of brake assemblies for each axle), the system includes four mechanically actuated sensors, each sensor having an actuator mounted within a service chamber of a different one of the brake assemblies.

In preferred embodiments, each sensor is designed for use with a motor vehicle air brake assembly that includes a service chamber, a push rod having an outer end outside the chamber and an inner end in the chamber, and a slack adjuster connected to the push rod's outer end. In response to increased air pressure in the chamber (produced in response to driver actuation of the vehicle's brake pedal), the push rod's outer end translates away from the chamber, with a maximum travel distance that is adjustable by controlling the slack adjuster. One of the inventive sensors mounted through the wall of the service chamber, with an actuator portion positioned in the chamber in the path that a brake element follows when the brake is applied (such brake element can be a service push rod diaphragm plate connected to the push rod). If the brake assembly is not properly adjusted, the brake element travels sufficiently far that it engages the actuator portion (thereby causing the display to indicate improper adjustment of the brake assembly). If the brake assembly is properly adjusted, the brake element does not engage the actuator (and the display indicates proper adjustment of the brake assembly).

DETAILED DESCRIPTION OF THE PREFERRED EMBODIMENTS

Figure 2:
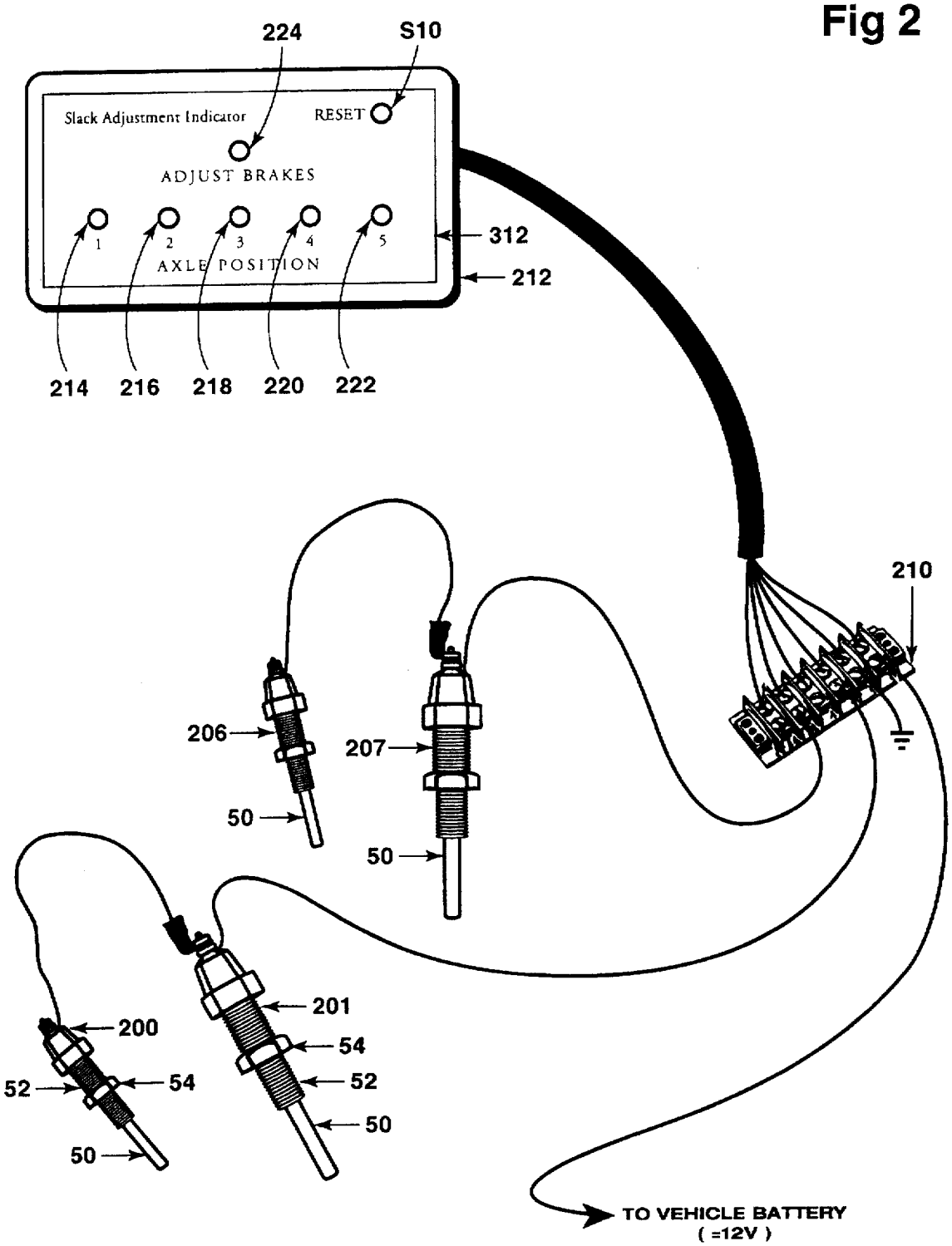
FIG. 2 is a perspective view of elements of a preferred embodiment of the inventive system (including four mechanically actuated sensors, each for mounting to a different air chamber of an air brake system).

In the preferred embodiment shown in FIG. 2, the brake assembly adjustment monitoring system of the invention includes four sensors (200, 201, 206, and 202), each having an actuator port ion 50 which extends within a service chamber of an air pressure actuated brake assembly; display panel assembly 212 (to be mounted to the dashboard of a motor vehicle); and terminal strip unit 210 electrically connected between the sensors and assembly 212. Assembly 212 includes LED assemblies (214, 216, 218, 220, and 222), LED 224, manually actuatable reset switch S10, and circuitry (shown in FIG. 6) for causing LED 224 and LED assemblies 214, 216, 218, 220, and 222 to emit light (of appropriate color) after each actuation of the brakes of the vehicle in which the FIG. 2 system is installed. Display of green light by LED assembly 214 indicates that the brake assemblies to which sensors 200 and 201 are mounted are correctly adjusted and that all wiring from the sensors up to the display input circuit is intact, display of red light by LED assembly 214 indicates that at least one of the brake assemblies to which sensors 200 and 201 are mounted is incorrectly adjusted or the wiring supplying the ground path from the sensors up to the display input circuit is open, display of green light by LED assembly 220 indicates that the brake assemblies to which sensors 206 and 207 are mounted are correctly adjusted and that all wiring from the sensors up to the display input circuit is intact, display of red light by LED assembly 220 indicates that at least one of the brake assemblies to which sensors 206 and 207 are mounted is incorrectly adjusted or the wiring supplying the ground path from the sensors up to the display input circuit is open and display of light (preferably red light) by LED 224 indicates that at least one of the brake assemblies to which sensors 200, 201, 206, and 207 are mounted is incorrectly adjusted or one or more of the wires from the brake chamber sensor sets up to the display circuit inputs is open.

The FIG. 2 system shows a typical two axle installation using a five axle display indicator in a two axle vehicle having a pair of brake assemblies for each axle. Sensors 200 and 206 are identical (and each is typically mounted to a brake assembly at the right (curb) side of one of the axles), and sensors 201 and 207 are identical (and each is typically mounted to a brake assembly at the left (driver) side of one of the axles). The preferred construction of sensors 200 and 206 will be described with reference to FIG. 4, the preferred construction of sensors 201 and 207 will be described with reference to FIG. 5, and the manner in which each sensor is mounted to a brake assembly will be described with reference to FIG. 3. For this configuration, axle indicators 216, 218, and 222 are not being used and their circuit inputs from unit 210 must be disabled. This is done by turning on appropriate dip switch segments and turning off appropriate dip switch segments.

Figure 6:
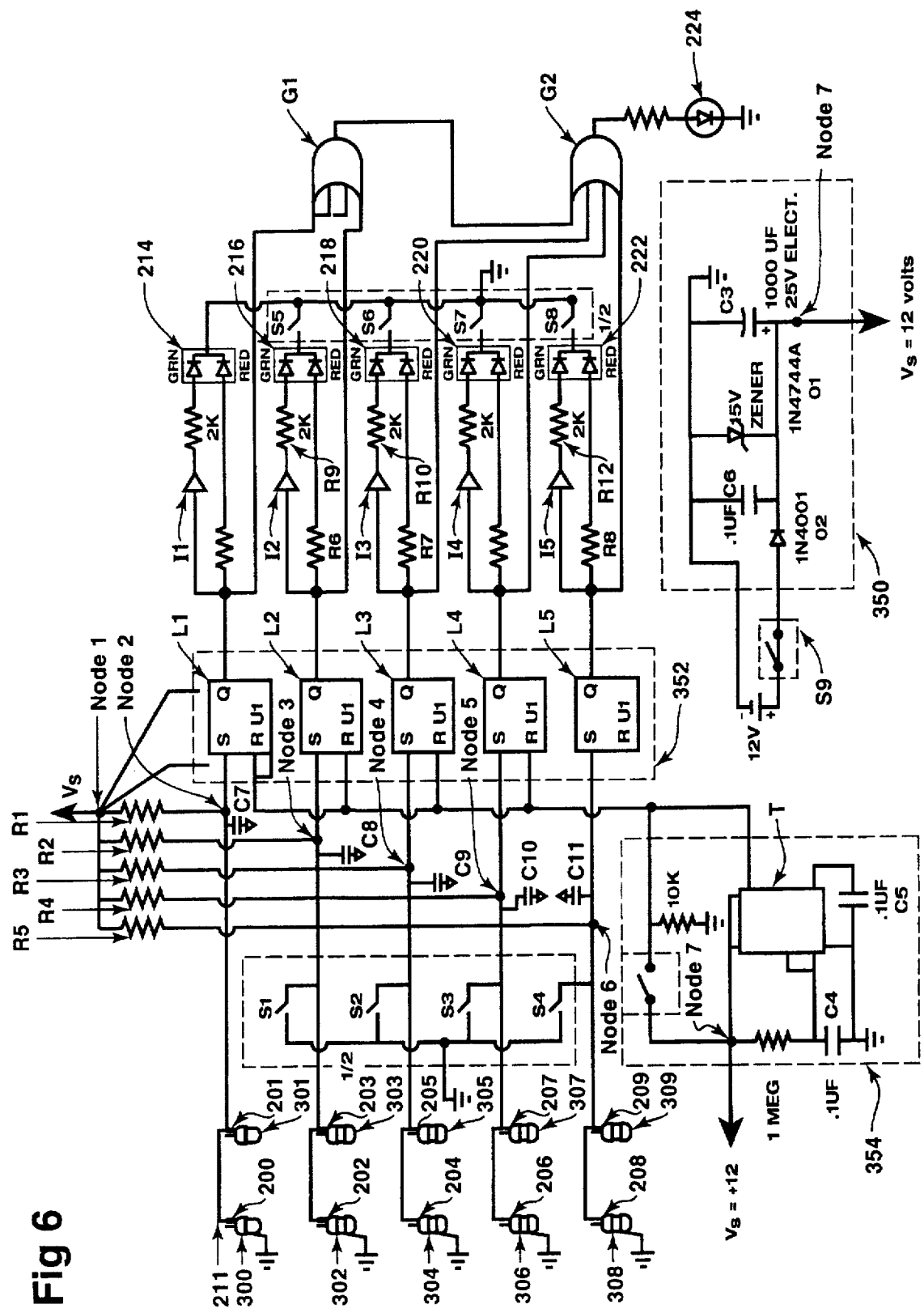
FIG. 6 is a schematic diagram of a second preferred embodiment of the inventive system, including five pairs of sensors installed in five pairs of motor vehicle brake assemblies.

In a variation of the FIG. 2 embodiment (for use in a five axle vehicle having a pair of brake assemblies for each axle), three additional pairs of sensors (e.g., sensors 202, 203, 204, 205, 208, and 209 as shown in FIG. 6) are electrically connected to the three unused terminals of terminal strip 210 of FIG. 2. Three of the additional sensors (e.g., sensors 202, 204, and 208) are identical to sensor 200, and each of sensor 200 and the four sensors identical thereto (sensors 200, 202, 204, 206, and 208) is mounted to a brake assembly at the right (curb) side of one of the axles. The other three additional sensors (e.g., sensors 203, 205, and 209) are identical to sensor 201, and each of sensor 201 and the four sensors identical thereto (sensors 201, 203, 205, 207, and 209) is mounted to a brake assembly at the left (driver) side of one of the axles. In this variation, display of green light by LED assembly 216 indicates that the brake assemblies to which sensors 202 and 203 are mounted are correctly adjusted and all wiring from the two chamber sensors up to the display circuit inputs is intact, display of red light by LED assembly 216 indicates that at least one of the brake assemblies to which sensors 202 and 203 are mounted is incorrectly adjusted or the wiring from the two chamber sensors up to the display circuit inputs is open, display of green light by LED assembly 218 indicates that the brake assemblies to which sensors 204 and 205 are mounted are correctly adjusted and all wiring from the two chamber sensors up to the display circuit inputs is intact, display of red light by LED assembly 218 indicates that at least one of the brake assemblies to which sensors 204 and 205 are mounted is incorrectly adjusted or the wiring from the two chamber sensors up to the display circuit inputs is open, display of green light by LED assembly 222 indicates that the brake assemblies to which sensors 208 and 209 are mounted are correctly adjusted and all wiring from the two chamber sensors up to the display circuit inputs is intact, display of red light by LED assembly 222 indicates that at least one of the brake assemblies to which sensors 208 and 209 are mounted is incorrectly adjusted or the wiring from the two chamber sensors up to the display circuit inputs is open, display of light (preferably red light) by LED 224 indicates that at least one of the brake assemblies to which sensors 200–209 are mounted is incorrectly adjusted, or at least one of the ground path wire paths for the respective circuits has been broken.

With reference again to FIG. 2, it is contemplated that assembly 212 is mounted on (or near to) the vehicle dashboard, so that each time the driver actuates the vehicle's brakes, the driver can view the resulting status of LED 224 and LED assemblies 214, 216, 218, 220, and 222 while remaining seated in front of the dashboard. Then, to reset the circuitry within assembly 212, the driver simply presses switch S10 for a moment (to close the switch S10 during that moment), or turns off the vehicle power at ignition switch S9 (ref. FIG. 6).

Figure 7:
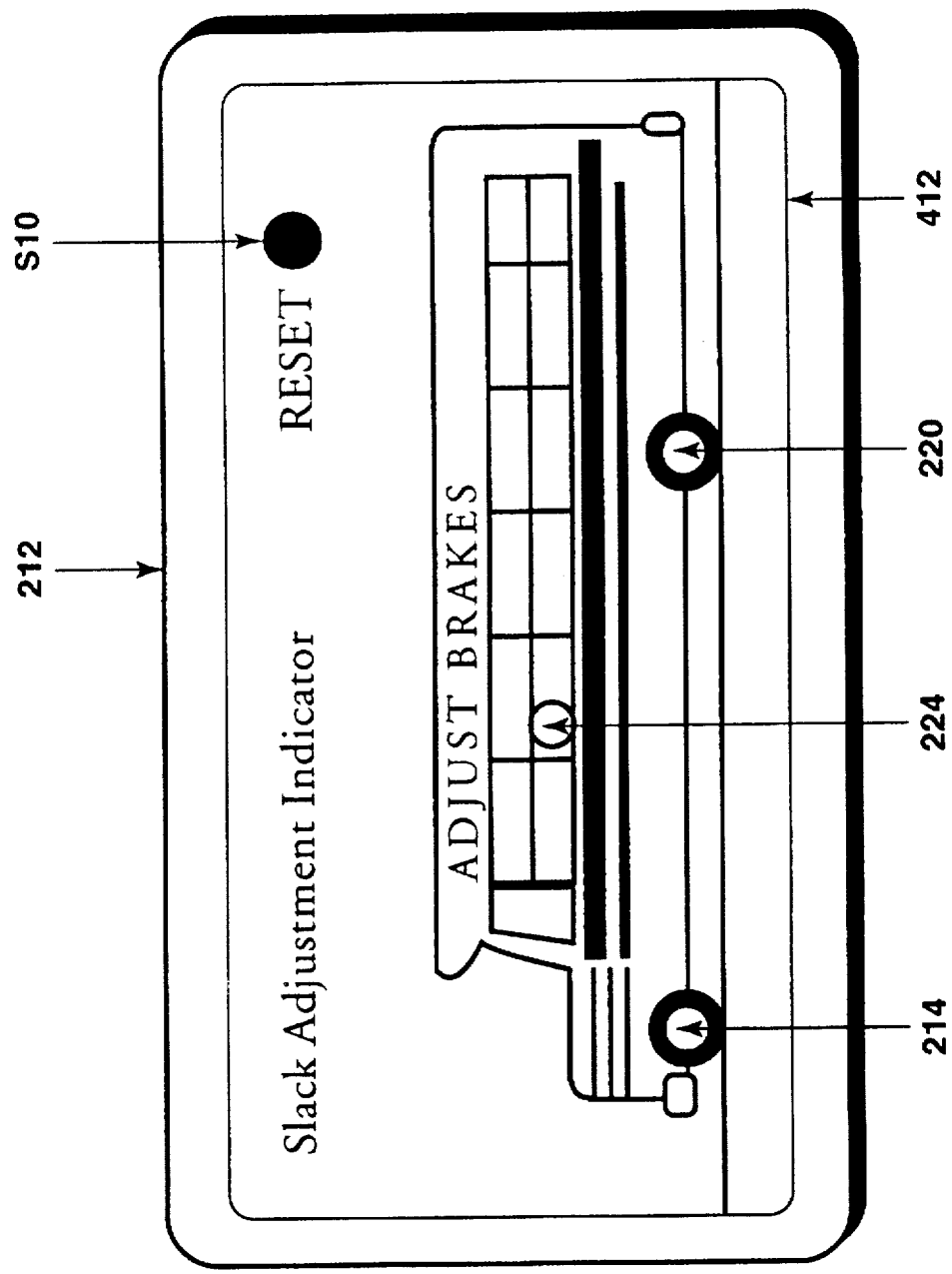
FIG. 7 is a front elevational view of display assembly 212 of FIG. 2, bearing a different adhesive label (label 412) than that (label 312) shown in FIG. 2.

As shown in FIG. 2, label 312 (having an adhesive back) is adhered to the face plate of assembly 212, and the surface of label 312 bears markings providing mnemonic labels for switch S10, and LED 224, and each of LED assemblies 214, 216, 218, 220, and 222. Since the FIG. 2 embodiment includes only two sensor pairs (sensors 200 and 201, and sensors 206 and 207), whose status is indicated by LED assemblies 214 and 220, respectively, the markings on label 312 representing unused LED assemblies 216, 218, and 222 are unnecessary and may be distracting to the driver. The inputs to the unused LED assemblies (corresponding to unused axle positions) should be disabled by turning on appropriate dip switches and the LED assemblies themselves can be disabled by turning off other appropriate dip switches. Where the inventive system includes only two sensor pairs connected as shown in FIG. 2, we prefer to adhere label 412 (shown in FIG. 7), rather than label 312, to the face plate of assembly 212. The surface of label 412 bears markings that provide mnemonic labels for switch S10, LED 224, and LED assemblies 214 and 220 only, and label 412 provides an opaque covering over unused assemblies 216, 218, and 222.

In the above-described variation on the FIG. 2 system which includes five pairs of sensors whose status is indicated by all five of LED assemblies 214, 216, 218, 220, and 222, label 312 of FIG. 2 should be used (rather than label 412). Label 312 and associated five axle display is capable of being used to display from one to five axle configurations. This is accomplished by disabling the unused axle inputs by turning on appropriate ones of dip switch segments S1, S2, S3, or S4 (of FIG. 6) which disable axle inputs 2 through 5 respectively. Individual LED assemblies 216, 218, 220, 222 can be disabled (turned off) if their axle inputs are not being used by opening (turning off) dip switch segments S5, S6, S7, or S8 (shown in FIG. 6), respectively.

Figure 1:
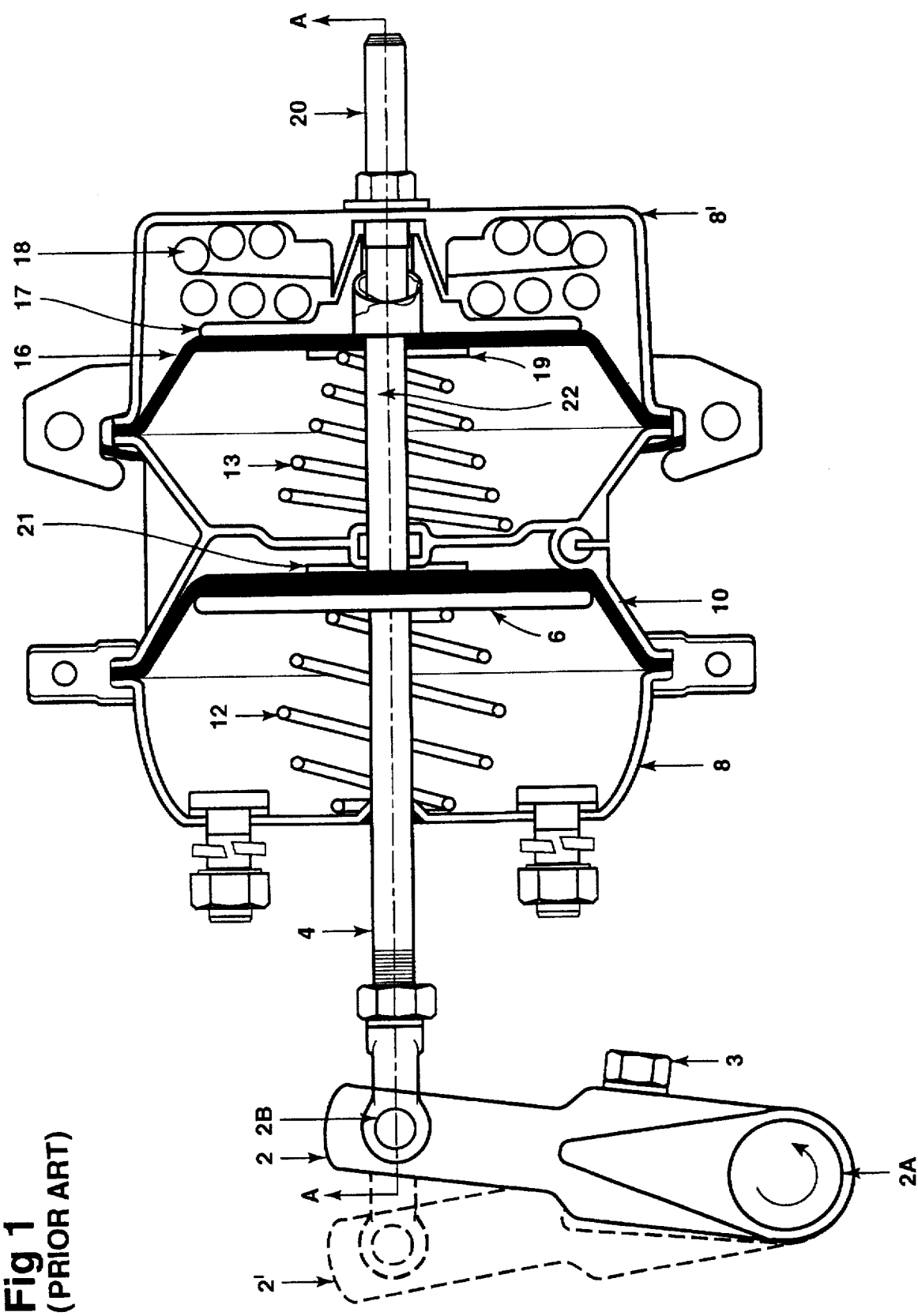
FIG. 1 is a side view (partially cut away) of a portion of conventional brake assembly.
Figure 1A:
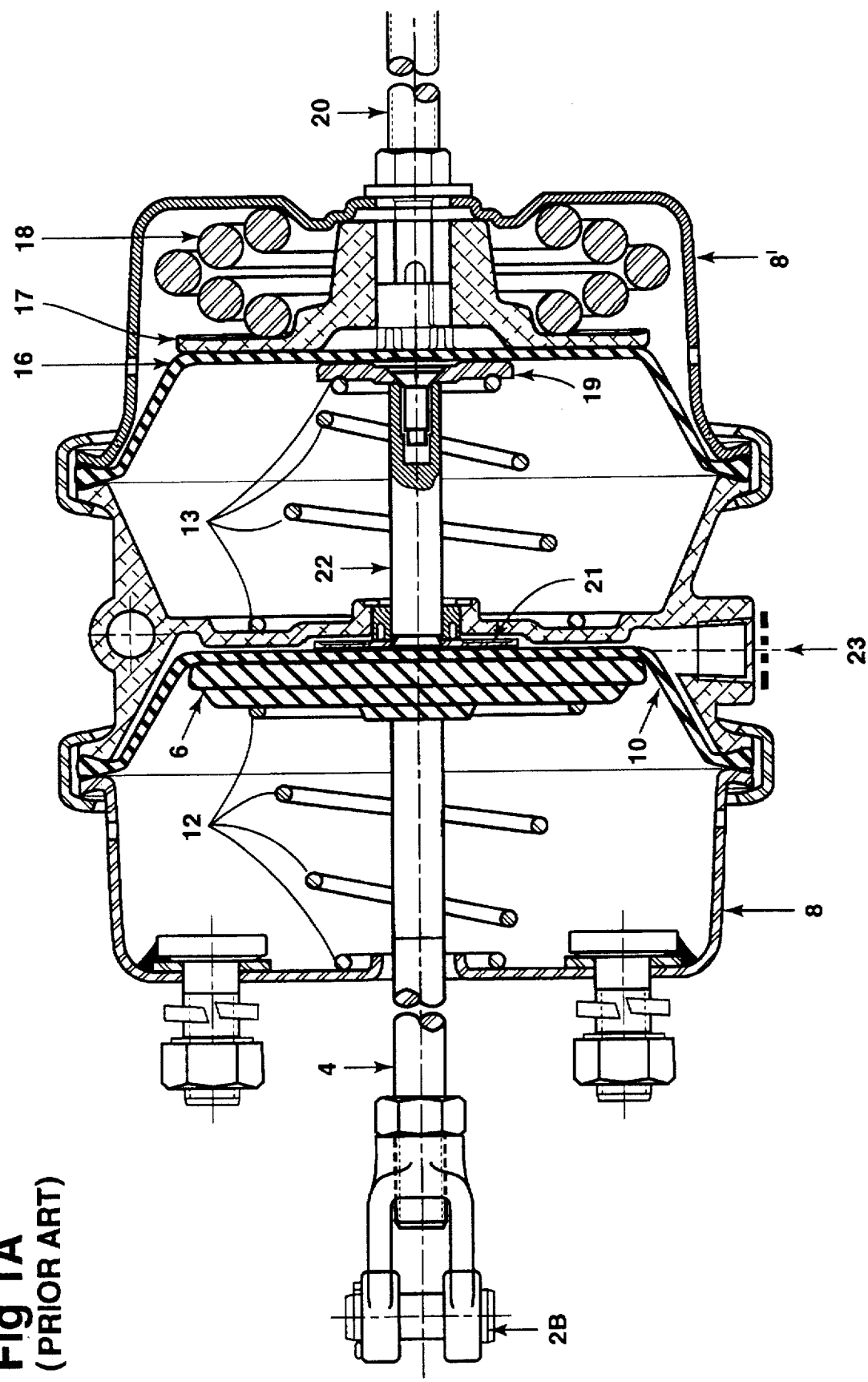
FIG. 1A is a cross-sectional view (along line A—A of FIG. 1) of the brake assembly of FIG. 1.
Figure 3:
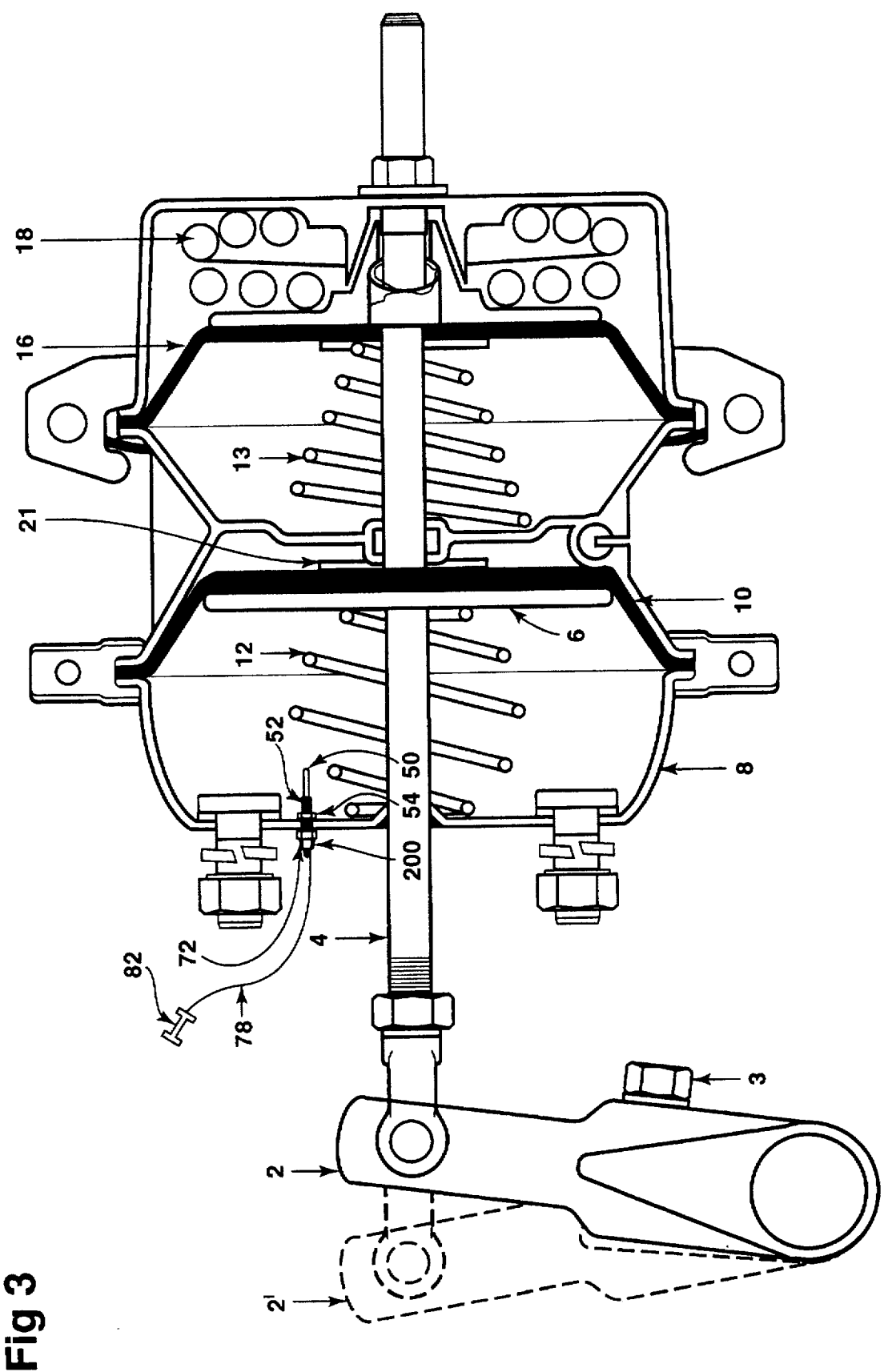
FIG. 3 is a side view (partially cut away) of a portion of the inventive system of FIG. 2, showing sensor 200 mounted through the wall of the air chamber (service brake chamber 8) of one brake assembly.

With reference to FIG. 3, we next describe the preferred manner in which each sensor is mounted to a brake assembly. FIG. 3 shows sensor 200 mounted through the wall of the service brake chamber (chamber 8) of a brake assembly of the type shown in FIG. 1. The elements of the FIG. 3 brake assembly that are identical to those of the FIG. 1 brake assembly are labeled with the same reference numbers in both FIG. 1 and FIG. 3 and the description thereof will not be repeated below with reference to FIG. 3. Although sensor 200 is shown in FIG. 3, sensor 201 is designed to be mounted through the wall of chamber 8 of the FIG. 3 brake assembly in the same manner as is sensor 200.

To mount sensor 200 through the wall of chamber 8 of FIG. 3, a hole is drilled through the wall. The hole is then tapped, and externally threaded (stainless steel) tube 52 of sensor 200 is screwed into the hole until actuator 50 of sensor 200 is positioned as follows: actuator 50's position is such that when the FIG. 3 brake assembly is properly adjusted, diaphragm plate 6 will not strike actuator 50 during a full brake actuation of the brake assembly (in which slack adjuster 2 is rotated into position 2' shown in phantom view, and thereby fully applying a brake of the vehicle); and actuator 50's position is such that actuator 50 is in the path that diaphragm plate 6 follows during actuation of the FIG. 3 brake assembly (when the brake assembly is not properly adjusted and the travel of diaphragm plate 6 exceeds the maximum allowed travel distance, it contacts and moves the end of actuator 50 which breaks the ground path of the inventive circuit for that axle and in turn causes display to activate the appropriate error indication on the display panel).

Sensor 200 is held in the proper position relative to the wall of chamber 8, by tightening jam nut 54 down against the exterior wall of brake chamber 8.

When adjuster 2 (and hence the brake assembly) is properly adjusted, its maximum stroke distance is set to have an appropriate value which depends on the size of service chamber 8. When slack adjuster 2 is improperly adjusted, plate 6 moves farther than the maximum stroke distance, reaches actuator 50, and pushes actuator 50 to the left (in FIG. 3) relative to fixed tube 52. In response, a normally closed switch within sensor 200 moves into an open configuration which it breaks (introduces an open circuit in) the ground path of the electrical circuit driving the display, between a node held at a supply voltage (typically +12 volts) and a node at ground, in a manner to be explained in more detail with reference to FIG. 6.

If single-wire sensor 200 having one external terminal including connection wire 78 (or another single-wire sensor designed in accordance with the invention) is installed in chamber 8 as shown in FIG. 3 (and as shown in more detail in FIG. 4), brass cap nut 72 and threaded tube 52 of sensor 200 are in contact with the metal wall of chamber 8, wire 78 is biased to be normally in contact with cap nut 72, and the chamber wall is itself at the circuit's ground potential (i.e., a conducting wire is connected between the "ground" terminal of terminal strip 210 of FIG. 2 and the chamber wall).

Figure 5:
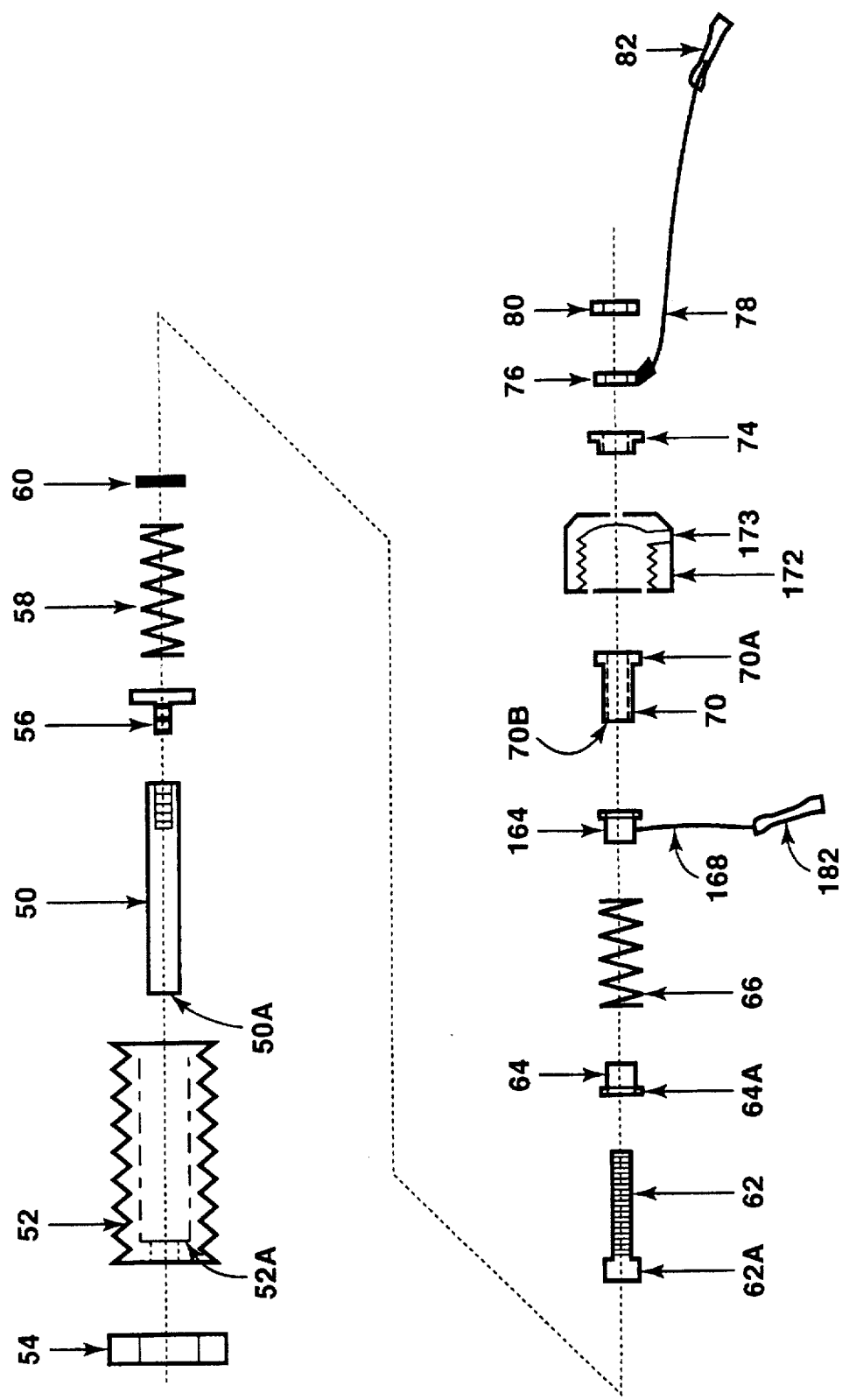
FIG. 5 is an exploded side view (partially cut away) of sensor 201 (of FIGS. 2 and 6).

When sensor 201 (having two external terminals, respectively including external connection wire 78 and external connection wire 168, as shown in FIG. 5) or another double-wire embodiment of the inventive sensor is installed in the wall of chamber 8 (rather than a single-wire sensor such as sensor 200), one end of a first one of the wires (e.g., one end of wire 168) is connected to one end of the internally insulated normally closed switch (e.g., to washer 164 thereof), the other end of the first wire (e.g., the other end of wire 168) is connected to the single wire of a single-wire sensor installed in the wall of the service chamber on the opposite end (usually the right end) of the same axle, one end of a second one of the wires of the two-wire sensor (e.g., one end of wire 78 of sensor 201) is biased to be normally in contact with the single wire of the single-wire sensor (through the internal, normally closed switch contact), and the other end of the second one of the wires of the two-wire sensor is connected to a terminal of terminal strip 210 of FIG. 2. When the connection between the two wires of the two-wire sensor (or the connection between wire 78 and nut 72 of the single-wire sensor) is mechanically broken (by movement of actuator pin 50 in either sensor away from its normal position), the second wire of the two-wire sensor (e.g., wire 78 of sensor 201) is decoupled from ground.

Figure 4:
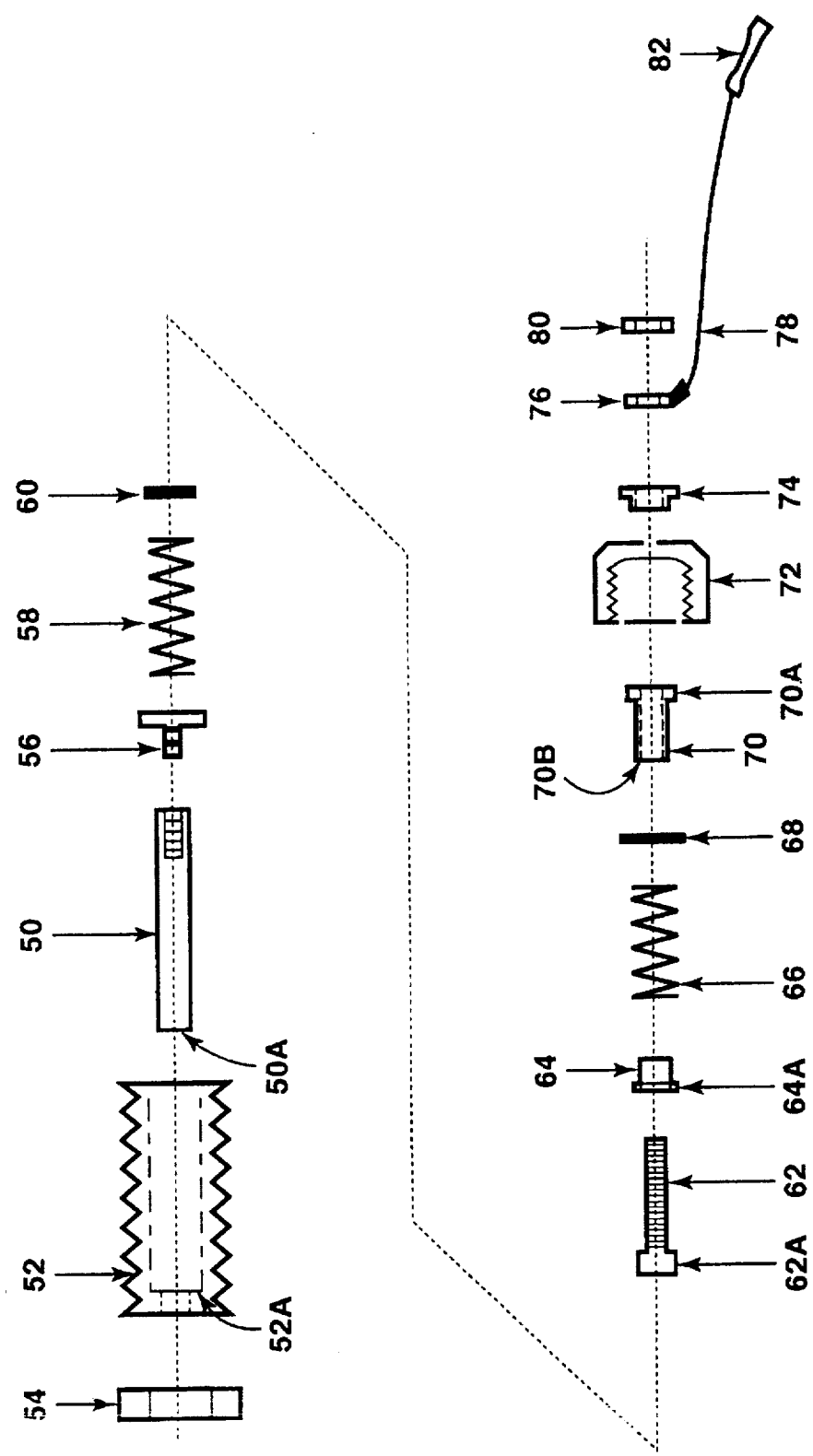
FIG. 4 is an exploded side view (partially cut away) of sensor 200 (of FIGS. 2, 3, and 6).

A preferred embodiment of sensor 200 is next described with reference to FIG. 4. As mentioned, the structure of sensor 200 is intended to bias the sensor to cause it to complete an electrical connection from the wall of chamber 8 (which is grounded) to wire 78 connected to cap nut 72 when sensor 200 is screwed through the wall of chamber 8. This is accomplished as follows.

Sensor 200 includes nylon actuator pin 50 having free end 50A (that faces plate 6 in chamber 8 when sensor 200 is installed), and an end opposite the free end into which screw 56 is threaded. Fillister head screw 62 is positioned with its left end (its head 62A) separated from screw 56 by spring 58 and insulated from screw 56 and spring 58 by nylon spacer 60. The assembly comprising stainless steel spring 58 (preferably having spring rate 12.5 pounds per inch), nylon spacer ring 60, brass eyelet 64, stainless steel spring 66 (preferably having spring rate 6 pounds per inch), brass washer 68, nylon shoulder washer 70, brass cap nut 72, nylon shoulder washer 74, and ring-shaped wire end 76 is placed (coaxially) over screw 62, and this assembly is held in place by screwing stainless steel nut 80 onto the right end of screw 62. When the assembly is assembled over screw 62, the body of washer 70 extends through washer 68, spring 66, and eyelet 64 until the left end 70B of washer 70 abuts shoulder 62A of Fillister head screw 62 (so nylon washer 70 electrically insulates the body of screw 62 from brass eyelet 64, spring 66, washer 68, and cap nut 72), the left end of nylon shoulder washer 74 extends into center hole of cap nut 72, thus insulating screw 62 from contact with nut 72, and wire end 76 is in electrical contact with the right end of Fillister head screw 62 protruding from the center of shoulder washer 74 (wire end 76 is secured in place with No. 4 nut 80). When cap nut 72 is screwed down over the right end of threaded tube 52, spring 58 is compressed between spacer 60 and the head of screw 56 (shoulder 52A within tube 52 engages the head of screw 56 when actuator 50 is fully extended leftward, thereby preventing spring 58 from pushing screw 56 and actuator 50 out the left end of tube 52), the right end of compressed spring 58 presses spacer 60 against shoulder 64A of eyelet 64, the left end of compressed spring 58 exerts a leftward force on screw 56 thus biasing actuator 50 into its normal position (in which actuator 50 is fully extended leftward into chamber 8), spring 66 is compressed between washer 68 (seated against inside shoulder 70A of shoulder washer 70 with outer edges in contact with the internal body of nut 72) and shoulder 64A of eyelet 64, the right end of compressed spring 66 presses washer 68 to the right against cap nut 72, and the left end of compressed spring 66 presses shoulder 64A of eyelet 64 to the left against head 62A of screw 62 which forms the normally closed contact of the switch (compressed spring 66 overcomes the weaker force normally exerted by spacer 60 in the opposite direction on shoulder 64A, so that the weaker force does not separate shoulder 64A from screw head 62A). Screw head 62A extends into the open center space of spacer 60 and is insulated from contact with spring 58 and screw 56. Thus, the assembly is spring-biased so that there is an electrical connection from the grounded chamber wall through cap nut 72 (nut 72 is mounted in electrical contact with threaded tube 52 which is grounded through the wall of brake chamber 8), washer 68, spring 66, and eyelet 64 to screw head 62A, through screw 62 to nut 80 and wire end 76, and from wire end 76 through wire 78 to butt connecter 82 (one end of wire 78 is connected to wire end 76, and the other end of wire 78 is connected to butt connector 82).

When the brake assembly is out-of-adjustment and plate 6 of the actuated brake assembly pushes actuator 50 and screw 56 together as a unit to the right (in FIG. 4), the right end of spring 58 pushes nylon spacer 60 to the right. Spacer 60 in turn pushes eyelet 64 to the right away from screw head 62A (overcoming the force exerted on eyelet 64 in the opposite direction by spring 66). In this way, the movement of actuator 50 breaks the electrical connection to screw 62 from the grounded chamber wall through cap nut 72, washer 68, spring 66, and eyelet 64 (since the displaced, electrically insulating spacer 60 separates shoulder 64A of eyelet 64 from head 62A of screw 62 and electrically insulating washer 70 separates the rest of eyelet 64 from screw 62). Thus, during each time period when actuator 50 is displaced from its normal, fully leftward-extended position, wire 78 and butt connector 82 are disconnected from ground, and instead wire 78 and connector 82 "float" in the electrical sense.

Next, a preferred embodiment of two-wire sensor 201 is described with reference to FIG. 5. Those components of sensor 201 of FIG. 5 that are identical to corresponding components of sensor 200 of FIG. 4 are numbered identically in FIGS. 4 and 5, and the description of them will not be repeated below As mentioned, the structure of sensor 201 is intended to bias sensor 201 into a position in which it completes an electrical connection between the two wires (78 and 168) of sensor 201 when sensor 201 is installed through the wall of chamber 8. This is accomplished in the following manner.

Brass cap nut 172 of sensor 201 differs from brass cap nut 72 of sensor 200 only in the following respect: there is a hole 173 through nut 172 through which wire 168 is threaded during assembly of sensor 201.

In addition to eyelet 64, sensor 201 includes second brass eyelet 164 to which one end of wire 168 is connected (sensor 201 includes eyelet 164 rather than washer 68). The other end of wire 168 is connected to butt connector 182. When sensor 201 is installed, butt connector 82 of sensor 201 (connected to wire 78 of sensor 201) is connected to a terminal of terminal strip 210 of FIG. 2, and a wire (such as wire 211 of FIG. 6) is connected between butt connector 182 of sensor 201 and a butt connector 82 of a single-wire sensor 200 installed in a brake assembly at the opposite end of the vehicle axle to which the brake assembly monitored by sensor 201 is installed.

When sensor 201 is assembled, the body of washer 70 extends through eyelet 164 (as well as through spring 66, and eyelet 64) until the left end 70B of washer 70 abuts shoulder 62A of Fillister head screw 62 (so nylon washer 70 electrically insulates the body of screw 62 from brass eyelets 64 and 164, spring 66, and cap nut 172). In assembled sensor 201, the right end of compressed spring 58 presses spacer 60 against shoulder 64A of eyelet 64, the left end of compressed spring 58 exerts a leftward force on screw 56 thus biasing actuator 50 into its normal position (in which actuator 50 is fully extended leftward into chamber 8), spring 66 is compressed between eyelet 164 (seated against shoulder 70A of shoulder washer 70 which in turn seats against and insulates eyelet 164 from the inner surface of nut 172) and shoulder 64A of eyelet 64 (seated against shoulder 62A of screw 62), the right end of compressed spring 66 presses eyelet 164 to the right against shoulder 70A of washer 70 which in turn presses against cap nut 172, and the left end of compressed spring 66 presses shoulder 64A of eyelet 64 to the left against head 62A of screw 62 (compressed spring 66 overcomes the weaker force normally exerted on spacer 60 by partially compressed spring 58 in the opposite direction on shoulder 64A, so that the weaker force does not separate shoulder 64A from screw head 62A, which forms the normally closed switch contact). Screw head 62A extends into the open center space of spacer 60 and is insulated from contact with spring 58 and screw 56. Thus, the assembly is spring-biased so that there is an electrical connection from eyelet 164 (and wire 168), through spring 66 and eyelet 64 to screw head 62A, through screw 62 to nut 80 and wire end 76, and from wire end 76 through wire 78 to butt connecter 82.

When the brake assembly in which sensor 201 is installed is out-of-adjustment and plate 6 of the actuated brake assembly pushes actuator 50 and screw 56 together as a unit to the right (in FIG. 5), the right end of spring 58 pushes nylon spacer 60 to the right. Spacer 60 in turn pushes eyelet 64 to the right away from screw head 62A (overcoming the force exerted on eyelet 64 in the opposite direction by spring 66). In this way, the movement of actuator 50 breaks the electrical connection to screw 62 from eyelet 164 (and wire 168) through spring 66 and eyelet 64 (since the displaced, electrically insulating spacer 60 separates shoulder 64A of eyelet 64 from head 62A of screw 62 and electrically insulating washer 70 separates eyelet 164 and the rest of eyelet 64 from screw 62 and cap nut 172). Thus, during each time period when actuator 50 is displaced from its normal, fully leftward-extended position, wire 78 is disconnected from wire 168. Thus, even if wire 168 is connected (through butt connectors and a wire therebetween, such as wire 211 of FIG. 6) to wire 78 of a single-wire sensor 200 installed in a nearby (properly adjusted) brake assembly, and the wire 78 of such nearby sensor 200 is connected to ground, wire 78 of sensor 201 will be decoupled from ground (in response to actuation of the out-of-adjustment brake assembly in which sensor 201 is installed).

FIG. 6 is a schematic diagram of a preferred embodiment of the inventive system including five pairs of sensors installed in five pairs of motor vehicle brake assemblies. Each brake assembly (except for the steer axle, which contains only a service brake assembly and not an emergency brake chamber) has the same construction as that shown in FIG. 3, and each sensor installed in one brake assembly in the same manner as sensor 200 of FIG. 3 is installed in the FIG. 3 brake assembly. With reference to FIG. 6, single-wire sensor 200 is installed in brake assembly 300 at one end of a first axle (steer axle), two-wire sensor 201 is installed in brake assembly 301 at the other end of the first axle, single-wire sensor 202 is installed in brake assembly 302 at one end of a second axle, two-wire sensor 203 is installed in brake assembly 303 at the other end of the second axle, single-wire sensor 204 is installed in brake assembly 304 at one end of a third axle, two-wire sensor 205 is installed in brake assembly 305 at the other end of the third axle, single-wire sensor 206 is installed in brake assembly 306 at one end of a fourth axle, two-wire sensor 207 is installed in brake assembly 307 at the other end of the fourth axle, single-wire sensor 208 is installed in brake assembly 308 at one end of a fifth axle, and two-wire sensor 209 is installed in brake assembly 309 at the other end of the fifth axle. Each of sensors 200, 202, 204, 206, and 208 is identical to single-wire sensor 200 of FIG. 4, and each of sensors 201, 203, 205, 207, and 209 is identical to double-wire sensor 201 of FIG. 5. A wire (e.g., wire 211) is connected between butt connector 82 of each single-wire sensor and butt connector 182 of each double-wire sensor.

Butt connector 82 of sensor 201 is connected through resistor R1 to supply voltage $V_s$, butt connector 82 of sensor 203 is connected through resistor R2 to supply voltage $V_s$, butt connector 82 of sensor 205 is connected through resistor R3 to supply voltage $V_s$, butt connector 82 of sensor 207 is connected through resistor R4 to supply voltage $V_s$, and butt connector 82 of sensor 209 is connected through resistor R5 to supply voltage $V_s$.

The components of the FIG. 6 circuit other than sensors 200–209 and brake assemblies 300–309 are preferably mounted in the vehicle cab, and thus the wires connecting sensors 201, 203, 205, 207, and 209 respectively with resistors R1, R2, R3, R4, and R5 are sufficiently long that the sensors are remote from the resistors. Terminal strip 210 of FIG. 2 is not shown in FIG. 6, but it is contemplated that such a terminal strip is connected anywhere where convenient between sensors 201, 203, 205, 207, and 209 and resistors R1, R2, R3, R4, and R5 (and between Node 7 and Node 1).

A 12-volt battery is connected through switch S9 to circuit 350. Typically, the 12-volt battery is a battery already installed in a vehicle being retrofitted in accordance with the invention, and switch S9 is the ignition switch of such vehicle. Circuit 350 includes diode D2, capacitor C6, Zener diode D1 (a 1 watt, 15 volt Zener diode for input voltage protection), and capacitor C3 connected as shown), and outputs filtered 12-volt supply voltage $V_s$.

The service chamber of each of brake assemblies 300, 302, 304, 306, and 308 is grounded. Thus, if each of brake assemblies 300 and 301 is properly adjusted, actuation of the brakes will not break the series connection between Node 1 (at voltage $V_s$) resistor R1, sensor 201, sensor 200, the service chamber of brake assembly 300 and ground. Similarly, if each of brake assemblies 302–309 is properly adjusted, actuation of the brakes will not break the series connection between Node 1 (at voltage $V_s$), resistor R2, sensor 203, sensor 202, the service chamber of brake assembly 302 and ground, the series connection between Node 1 (at voltage $V_s$), resistor R3, sensor 205, sensor 204, the service chamber of brake assembly 304 and ground, the series connection between Node 1 (at voltage $V_s$), resistor R4, sensor 207, sensor 206, the service chamber of brake assembly 306 and ground, or the series connection between Node 1 (at voltage $V_s$), resistor R5, sensor 209, sensor 208, the service chamber of brake assembly 308 and ground. Thus, if each of brake assemblies 300–309 is properly adjusted, there is a low voltage (substantially equal to ground voltage) at each of Node 2, Node 3, Node 4, Node, 5, and Node 6 at all times.

However, if any of brake assemblies 300–309 is improperly adjusted or there is a break in the series connected wiring from the chambers up to the appropriate nodes, there will be a high voltage (substantially equal to $V_s$) at the corresponding one of Nodes 2–6 following actuation of the brakes or breaking of the ground path wiring. This can be understood by considering the case in which brake assembly 301 is improperly adjusted but all the other brake assemblies are properly adjusted, and all wiring connections are intact. In this case, full actuation of the brakes causes movement of actuator 50 of sensor 201, which in turn causes sensor 201 to move into a configuration which breaks the series connection between Node 1 (at voltage $V_s$) and resistor R1 (on one side of sensor 201), and sensor 200 and the grounded service chamber of brake assembly 300 (on the other side of sensor 201). As a result, no current flows through resistor R1, and Node 2 (as well as Node 1) is at voltage $V_s$.

Similarly, if all the brake assemblies are properly adjusted except assembly 300, and all wiring is intact, there will be a high voltage (substantially equal to $V_s$) at Node 2, and a low voltage (substantially equal to ground) at each of Nodes 3–6, following full actuation of the brakes. If all the brake assemblies are properly adjusted except assemblies 301 and 309, and all wiring is intact, there will be a high voltage (substantially equal to $V_s$) at each of Node 2 and Node 6, and a low voltage at each of Node 3, Node 4, and Node 5, following full actuation of the brakes.

The FIG. 6 system includes latch circuits L1, L2, L3, L4, and L5, each having an input terminal connected to Node 2, Node 3, Node 4, Node 5, and Node 6, respectively. Each of circuits L1–L5 is preferably a conventional 4043 integrated latch circuit (a CMOS quad three-state NOR R/S latch IC). All of circuits L1–L5 are mounted on printed circuit board 352 which is connected between Node 1 and ground as shown. After circuits L1–L5 have been reset (in a manner to be described below), each operates as follows: in response to a low-to-high voltage transition (e.g., a transition from a low voltage substantially equal to ground potential to a high voltage substantially equal to $V_s$=+12 volts) at its "S" input terminal (the input of L1 connected to Node 2, the input of L2 connected to Node 3, the input of L3 connected to Node 4, the input of L4 connected to Node 5, and the input of L5 connected to Node 6), the "Q" output terminal of each of circuits L1–L5 also undergoes a low-to-high voltage transition, and remains at such high voltage until circuits L1–L5 are reset again).

When switch S9 has been closed and latch circuits L1–L5 have been reset, but before actuation of the brake assemblies, current flows through resistors R1–R5, and Node 2, Node 3, Node 4, Node 5, and Node 6 are at a low voltage (substantially equal to ground potential), and each of circuits L1–L5 outputs this low voltage at its "Q" output terminal. Then, if Node 2, Node 3, Node 4, Node 5, and Node 6 remain at such low voltage after actuation of the brakes (which occurs if all the brake assemblies are properly adjusted, and all ground path wiring from the nodes to the brake chambers is intact), circuits L1–L5 continue to output this low voltage at their "Q" output terminals after such brake actuation.

Preferably, each of Node 2 through Node 6 is connected to ground through a capacitor (one of capacitors C7, C8, C9, C10, and C11, each connected as shown in FIG. 6). The presence of such capacitors has the following effect: unless the input ground path is broken for more than a minimum time period (preferably 0.1 second) determined by the RC time constant of the capacitance of each capacitor C7–C11 and the resistance of its associated resistor R1–R5, circuits L1–L5 will not respond to a ground path break by outputting a high voltage at its "Q" output terminal following a brake actuation.

Reset circuit 354 (connected as shown in FIG. 6) asserts a voltage pulse to the reset terminals of each of latch circuits L1–L5 (the terminals labeled "R" in FIG. 6) at appropriate times. Reset circuit 354 includes switch S10 (shown in FIG. 2 as well as in FIG. 6) connected between Node 7' (held at supply voltage $V_s$) and the reset terminals of latch circuits L1–L5, and timer circuit T (which is preferably an NE555 integrated timer circuit available from Motorola, or an equivalent thereto). When the vehicle driver manually closes switch S10 at a time when supply voltage $V_s$ is substantially +12 volts (when vehicle ignition switch S9 is on), a high voltage pulse (having amplitude substantially equal to +12 volts) is applied to the reset terminals of each of latch circuits L1–L5. This high voltage pulse resets circuits L1–L5 so that each of circuits L1–L5 asserts a low voltage (substantially equal to ground potential) at its "Q" output terminal.

Timer circuit T of reset circuit 354 operates as follows. In response to a low-to-high (e.g., zero-to-twelve volt) transition of supply voltage $V_s$ (which occurs when vehicle ignition switch S9 is closed), timer T asserts a high voltage pulse (of amplitude substantially equal to the high value of $V_s$, e.g., 12 volts) to the reset terminals of latch circuits L1–L5, thereby resetting circuits L1–L5. Timer T preferably asserts an approximately one second long voltage pulse after the low-to-high transition of supply voltage $V_s$.

Each of LED assemblies 214, 216, 218, 220, and 222 of FIG. 6 includes a green LED (which emits green light in response to a sufficiently high voltage across it) and a red LED (which emits red light in response to a sufficiently high voltage across it). Dip switches S5, S6, S7, and S8 are normally closed, to enable operation of all LED assemblies 216, 218, 220, and 222. Each of LED assemblies 216, 218, 220, and 222 is disabled (when desired) by opening the dip switches (S5, S6, S7, or S8) connected thereto, thereby preventing current flow through each LED assembly to be disabled.

LED assemblies 214, 216, 218, 220, and 222 are driven as follows. When the voltage at the output of each of circuits L1–L5 is low (e.g., at ground potential), such as immediately following a reset of circuits L1–L5), the voltage across the red LED in each of LED assemblies 214, 216, 218, 220, and 222 is less than the threshold value required for red light emission, and thus none of the red LEDs emits light. However, inverters I1, I2, I3, I4, and I5 are connected respectively between circuit L1 and the green LED in assembly 214, circuit L2 and the green LED in assembly 216, circuit L3 and the green LED in assembly 218, circuit L4 and the green LED in assembly 220, and circuit L5 and the green LED in assembly 222, to invert the low output voltage of each circuit L1–L5 (to a value above the threshold value required for green light emission by each green LED). Thus, each of the green LEDs of assemblies 214, 216, 218, 220, and 222 emits green light in response to assertion of a low voltage at the output of each of circuits L1–L5.

When the voltage at the output of any one of circuits L1–L5 is high (e.g., 12 volts) because a brake assembly being monitored thereby is improperly adjusted, or its respective series ground path wiring is broken free, the voltage across the green LED in the corresponding one of LED assemblies 214, 216, 218, 220, and 222 (between ground and the output of one of inverters I1, I2, I3, I4, and I5) is less than the threshold value required for green light emission, and thus this green LED does not emit light. However, the red LED in the corresponding one of assemblies 214, 216, 218, 220, and 222 emits red light in response to assertion of the high voltage at the output of said one of circuits L1–L5. In this way, the FIG. 6 circuit displays red light from each of LED assemblies 214–222 (on display panel assembly 212) that corresponds to a vehicle axle along which an improperly adjusted brake assembly is mounted or whose series ground path wiring has been broken.

The FIG. 6 circuit also includes OR gates G1 and G2, connected as shown, for driving LED 224 (connected between ground and the output of OR gate G2). When the voltage at the output of at least one of circuits L1–L5 is high (e.g., 12 volts) because a brake assembly being monitored thereby is improperly adjusted or whose series ground path wiring has been broken, at least one of the inputs of OR gate G2 is high. Under this condition, the output of OR gate G2 is high (above the threshold value required for light emission by LED 224), and LED 224 emits light. Preferably LED 224 is chosen to emit red light under this condition. In this way, the FIG. 6 circuit displays light (preferably red light) from LED 224 (on display panel assembly 212) that indicates an improperly adjusted brake assembly mounted along at least one vehicle axle or one or more of the series ground paths from the brake chambers to the display panel input points has been broken.

Still with reference to FIG. 6, each of resistors R1, R2, R3, R4, and R5 is a 10,000 ohm resistor. All other resistors in FIG. 6 are 330 ohm resistors unless otherwise indicated.

Normally open switches S1, S2, S3, and S4 are connected in the positions shown in FIG. 6, to enable portions of the FIG. 6 circuit to be disabled when desired. In particular, when switch S1, S2, S3, or S4 is closed, the corresponding one of Node 3, Node 4, Node 5, and Node 6 connected to such switch is grounded. By grounding Node 3, Node 4, Node 5, or Node 6, respectively, the corresponding one of latch circuits L2, L3, L4, or L5 is disabled (so that its output voltage will always be low). Thus, for example, if brake assemblies 304 are 305 are omitted from the FIG. 6 system, latch L3 can be disabled by closing switch S2 (to cause LED assembly 218 always to emit green light and to prevent a high input from L3 to OR gate G2 and resultant turning on of LED 224). If the input to L3 is disabled, the display of LED assembly 218 is redundant and can be disabled by opening dip switch segment S6.

In embodiments (for use with a two axle vehicle) including only sensors 200, 201, 206, and 207, whose status is indicated by LED assemblies 214 and 220, respectively, the following components of the FIG. 6 circuit are preferably omitted: latch L5, LED assemblies 216, 218, and 222, dip switches S1 through S8, and resistors R6, R7, R8, R9, R10, and R12. When these components are left out, one must install jumpers across dip switch hole positions S1, S2 and S7. The jumpers across S1, S2 disable the unused inputs to L2 and L3 which otherwise would cause high outputs from L2, L3, G1, and G2 and cause LED assembly 224 to display red indicating an adjustment error or broken wiring. The jumper at S7 enables LED assembly 220.

Figure 8:
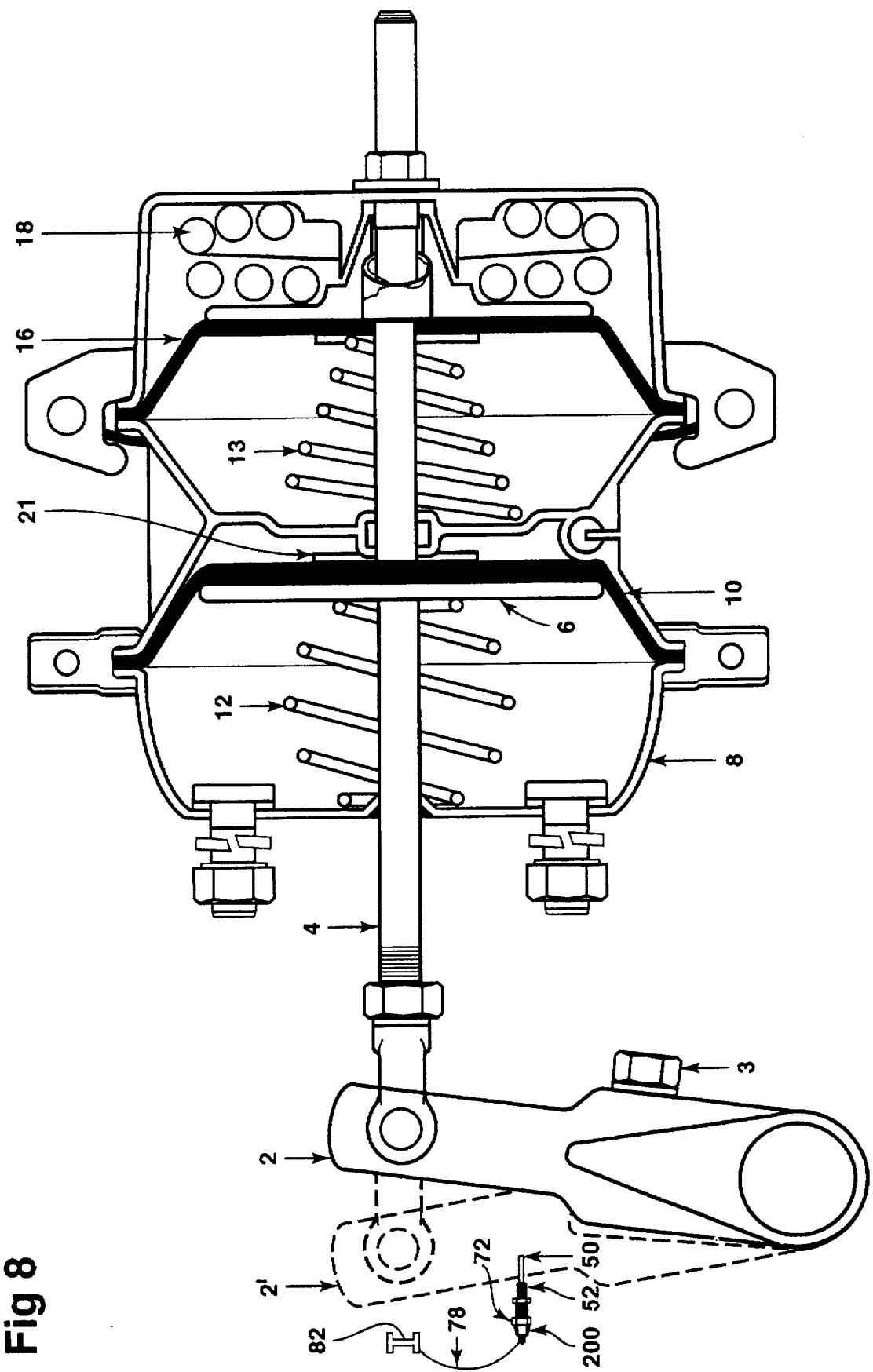
FIG. 8 is a side view (partially cut away) of a portion of a variation on the system of FIG. 2, showing sensor 200 mounted outside the wall of service brake chamber 8 of one brake assembly.

In alternative embodiments, a self-contained, compactly shaped sensor having a movable actuator portion (e.g., a sensor of the type described with reference to FIG. 4 or 5) is fixedly mounted outside the air chamber of an air brake assembly in a position satisfying the following criteria: when the brake assembly is properly adjusted, the actuator portion is not mechanically displaced (relative to a fixed portion of the sensor) by any moving element of the brake assembly in response to actuation of the properly adjusted brake assembly; and when the brake assembly is not properly adjusted, the actuator portion is mechanically displaced (relative to the fixed portion) by an element of the brake assembly (e.g., a portion of push rod 4 outside chamber 8 in FIG. 3) while such element moves in response to actuation of the improperly adjusted brake assembly. A display is generated (e.g., red or green light is emitted from a display panel, preferably mounted in the cab of the vehicle to which the brake assembly is mounted) that is indicative of whether the actuator portion has or has not been displaced during actuation of the brake assembly. Due to its self-contained design, the sensor is not vulnerable to having one of its components moved out of alignment relative to another of its components (even though the actuator portion is not protected by being mounted within the air chamber). FIG. 8 shows such a compactly shaped sensor (sensor 200, having a movable actuator portion 50) mounted outside air chamber 8 of an air brake assembly in a position as described. When the brake assembly is properly adjusted, actuator portion 50 of FIG. 8 is not mechanically displaced (relative to the sensor's fixed portion) by any moving element of the brake assembly in response to actuation of the properly adjusted brake assembly. When the brake assembly is not properly adjusted, actuator portion 50 of FIG. 8 is mechanically displaced (to the left in FIG. 8 relative to sensor 200's fixed portion) by slack adjuster 2 of the brake assembly (which is pivotally attached to the end of push rod 4 outside chamber 8) while slack adjuster 2 rotates in response to actuation of the improperly adjusted brake assembly.

Although embodiments for monitoring adjustment of air pressure-actuated brake assemblies have been described, the invention is also useful for monitoring adjustment of brake assemblies having adjustable moving elements actuated by means other than air pressure. In these alternative embodiments, a movable actuator portion of a fixedly mounted sensor is mechanically displaced (relative to the fixed portion of the sensor) in accordance with the invention by a moving element of a brake assembly (when the brake assembly is improperly adjusted), and a display is generated (e.g., red or green light is emitted from a display panel) that is indicative of whether the actuator portion has or has not been displaced during actuation of the brake assembly.

It should be understood that various other alternatives to the embodiments of the invention described herein may be employed in practicing the invention. Thus, it is intended that the following claims define the scope of the invention and that structures within the scope of these claims and their equivalents be covered thereby.

What is claimed is:

1. A system for monitoring brake adjustment, including:

a first brake assembly including a first service chamber having a wall enclosing a first volume, and a first element which moves within the first volume during actuation of the first brake assembly;

a first sensor mounted through the wall of the first service chamber, said first sensor having a first actuator portion biased to protrude in a first position in the first volume, wherein the first actuator portion is movable from the first position to a second position in response to engagement by the first element during actuation of the first brake assembly when said first brake assembly is improperly adjusted;

a display device including first means for indicating status of the first sensor;

circuit means connected between the first sensor and the display device for driving the first means to a first state in response to the first actuator portion remaining in the first position after actuation of the first brake assembly and for driving the first means to a second state in response to the first actuator portion entering the second position during actuation of the first brake assembly;

a second brake assembly including a second service chamber having a wall enclosing a second volume, and a second element which moves within the second volume during actuation of the second brake assembly; and a second sensor mounted through the wall of the second service chamber, said second sensor having a second actuator portion biased to Protrude in a first position in the second volume, wherein the second actuator portion is movable from the first position to a second position in response to engagement by the second element during actuation of the second brake assembly when said second brake assembly is improperly adjusted; and wherein the display device also includes a second means for indicating status of the second sensor, wherein the circuit means is also connected between the second sensor and the display device, and wherein the circuit means includes means for driving the second means to a first state in response to the second actuator portion remaining in the first position after actuation of the second brake assembly and for driving the second means to a second state in response to the second actuator portion entering the second position during actuation of the second brake assembly, and wherein each of the first service chamber and the second service chamber is grounded, and the circuit means includes:

a ground path from a first node through the first sensor to the first service chamber and from a second node through the second sensor to the second service chamber, wherein the first sensor introduces an open circuit in the ground path when the first actuator portion is in the second position and the second sensor introduces an open circuit in the ground path when the second actuator portion is in the second position;

a first circuit branch, having non-zero resistance, connected between the first node and a third node;

a second circuit branch, having non-zero resistance, connected between the second node and a fourth node;

means for holding the third node and the fourth node at a supply voltage;

a first latch circuit having an input terminal connected to the first node and an output terminal connected to the first means, wherein the first latch circuit asserts a first voltage at the output terminal in response to the first actuator portion remaining in the first position after actuation of the first brake assembly and asserts a second voltage at the output terminal in response to the first actuator portion entering the second position during actuation of the first brake assembly; and a second latch circuit having an input terminal connected to the second node and an output terminal connected to the second means, wherein the second latch circuit asserts the first voltage at its output terminal in response to the second actuator portion remaining in the first position after actuation of the second brake assembly and asserts the second voltage at its output terminal in response to the second actuator portion entering the second position during actuation of the second brake assembly.

2. A system for monitoring brake adjustment, including:

a first brake assembly including a first service chamber having a wall enclosing a first volume, and a first element which moves within the first volume during actuation of the first brake assembly;

a first sensor mounted through the wall of the first service chamber, said first sensor having a first actuator portion biased to protrude in a first position in the first volume, wherein the first actuator portion is movable from the first position to a second position in response to engagement by the first element during actuation of the first brake assembly when said first brake assembly is improperly adjusted;

a display device including first means for indicating status of the first sensor;

circuit means connected between the first sensor and the display device for driving the first means to a first state in response to the first actuator portion remaining in the first position after actuation of the first brake assembly and for driving the first means to a second state in response to the first actuator portion entering the second position during actuation of the first brake assembly;

a third brake assembly including a third service chamber having a wall enclosing a third volume, and a third element which moves within the third volume during actuation of the third brake assembly; and a third sensor mounted through the wall of the third service chamber, said third sensor having a third actuator portion biased to protrude in a first position in the third volume, wherein the third actuator portion is movable from the first position to a second position in response to engagement by the third element during actuation of the third brake assembly when said third brake assembly is improperly adjusted, wherein the first means of the display device indicates status of both the first sensor and the third sensor, and wherein the circuit means includes means for driving the first means to the first state in response to both the first actuator portion and the third actuator portion remaining in the first position after actuation of said first brake assembly and said third brake assembly and for driving the first means to the second state in response to at least one of the first actuator portion and the third actuator portion entering the second position during actuation of said first brake assembly and said third brake assembly, wherein the first service chamber is grounded, and the first sensor includes:

first electrically conducting means electrically connected to the first service chamber;

second electrically conducting means electrically connected to a first external terminal;

means for biasing the first electrically conducting means in electrical contact with the second electrically conducting means when the first actuator portion is in the first position; and means for electrically decoupling the first electrically conducting means from the second electrically conducting means in response to the first actuator portion moving to the second position.

3. The system of claim 2, wherein the third sensor includes:

third electrically conducting means electrically connected to the first external terminal of the first sensor;

fourth electrically conducting means electrically connected to a second external terminal;

means for biasing the third electrically conducting means in electrical contact with the fourth electrically conducting means when the third actuator portion is in the first position; and means for electrically decoupling the third electrically conducting means from the fourth electrically conducting means in response to the third actuator portion moving to the second position.

4. A system for monitoring brake adjustment, including:

a first brake assembly including a first service chamber having a wall enclosing a first volume, and a first element which moves within the first volume during actuation of the first brake assembly;

a first sensor mounted through the wall of the first service chamber, said first sensor having a first actuator portion biased to protrude in a first position in the first volume, wherein the first actuator portion is movable from the first position to a second position in response to engagement by the first element during actuation of the first brake assembly when said first brake assembly is improperly adjusted;

a display device including first means for indicating status of the first sensor;

circuit means connected between the first sensor and the display device for driving the first means to a first state in response to the first actuator portion remaining in the first position after actuation of the first brake assembly and for driving the first means to a second state in response to the first actuator portion entering the second position during actuation of the first brake assembly;

a third brake assembly including a third service chamber having a wall enclosing a third volume, and a third element which moves within the third volume during actuation of the third brake assembly; and a third sensor mounted through the wall of the third service chamber, said third sensor having a third actuator portion biased to protrude in a first position in the third volume, wherein the third actuator portion is movable from the first position to a second position in response to engagement by the third element during actuation of the third brake assembly when said third brake assembly is improperly adjusted, wherein the first means of the display device indicates status of both the first sensor and the third sensor, and wherein the circuit means includes means for driving the first means to the first state in response to both the first actuator portion and the third actuator portion remaining in the first position after actuation of said first brake assembly and said third brake assembly and for driving the first means to the second state in response to at least one of the first actuator portion and the third actuator portion entering the second position during actuation of said first brake assembly and said third brake assembly, wherein the first brake assembly and the third brake assembly are mounted at opposite ends of an axle of a motor vehicle.

5. The system of claim 4, wherein the display device is mounted at a dashboard of the motor vehicle, and the second brake assembly is mounted to another axle of the motor vehicle.

6. A system for monitoring brake adjustment, including:

a first brake assembly including a first service chamber having a wall enclosing a first volume, and a first element which moves within the first volume during actuation of the first brake assembly;

a first sensor mounted through the wall of the first service chamber, said first sensor having a first actuator portion biased to protrude in a first position in the first volume, wherein the first actuator portion is movable from the first position to a second position in response to engagement by the first element during actuation of the first brake assembly when said first brake assembly is improperly adjusted;

a display device including first means for indicating status of the first sensor;

circuit means connected between the first sensor and the display device for driving the first means to a first state in response to the first actuator portion remaining in the first position after actuation of the first brake assembly and for driving the first means to a second state in response to the first actuator portion entering the second position during actuation of the first brake assembly, wherein the first service chamber is grounded, and the circuit means includes:

a ground path from a first node through the first sensor to the first service chamber, wherein the first sensor introduces an open circuit in the ground path when the first actuator portion is in the second position;

a first circuit branch, having non-zero resistance, connected between the first node and a second node;

means for holding the second node at a supply voltage; and a first latch circuit having an input terminal connected to the first node and an output terminal connected to the first means, wherein the first latch circuit asserts a first voltage at the output terminal in response to the first actuator portion remaining in the first position after actuation of the first brake assembly and asserts a second voltage at the output terminal in response to the first actuator portion entering the second position during actuation of the first brake assembly.

7. The system of claim 6, also including:

a third brake assembly including a third service chamber having a wall enclosing a third volume, and a third element which moves within the third volume during actuation of the third brake assembly; and a third sensor mounted through the wall of the third service chamber, said third sensor having a third actuator portion biased to protrude in a first position in the third volume, wherein the third actuator portion is movable from the first position to a second position in response to engagement by the third element during actuation of the third brake assembly when said third brake assembly is improperly adjusted, wherein the first means of the display device indicates status of both the first sensor and the third sensor, and wherein the ground path of the circuit means is from the first node through the second sensor and the first sensor to the first service chamber, wherein the first sensor introduces an open circuit in the ground path when the first actuator portion is in the second position and the second sensor introduces an open circuit in the ground path when the second actuator portion is in the second position.

8. A sensor for use in a system for monitoring adjustment of a brake having a service chamber, wherein the service chamber has a wall enclosing a volume, said sensor including:

an electrically conducting mounting means for mounting the sensor to the wall, wherein the electrically conducting mounting means is in electrical contact with the service chamber when the sensor is mounted to the wall;

a second electrically conducting means electrically connected to a first external terminal;

an actuator portion which protrudes into the volume when the sensor is mounted to said wall and which is movable from a first position to a second position;

means for biasing the electrically conducting mounting means in electrical contact with the second electrically conducting means when the actuator portion is in the first position; and means for electrically decoupling the electrically conducting mounting means from the second electrically conducting means in response to the actuator portion moving to the second position.

9. A sensor for use in a system for monitoring adjustment of a brake having a service chamber, wherein the service chamber has a wall enclosing a volume, said sensor including:

an electrically conducting mounting means for mounting the sensor to the wall, wherein the electrically conducting mounting means is in electrical contact with a first external terminal when the sensor is mounted to the wall;

second electrically conducting means electrically connected to a second external terminal;

an actuator portion which protrudes into the volume when the sensor is mounted to said wall and which is movable from a first position to a second position;

means for biasing the electrically conducting mounting means in electrical contact with the second electrically conducting means when the actuator portion is in the first position; and means for electrically decoupling the electrically conducting mounting means from the second electrically conducting means in response to the actuator portion moving to the second position.

* * * * *